(12) United States Patent
Vogt et al.

(10) Patent No.: US 9,016,806 B2
(45) Date of Patent: Apr. 28, 2015

(54) BRAKE ACTUATING UNIT FOR ACTUATING A MOTOR VEHICLE BRAKING SYSTEM OF THE "BRAKE-BY-WIRE" TYPE, AND METHOD FOR OPERATING A MOTOR VEHICLE BRAKING SYSTEM BY MEANS OF SUCH A BRAKE ACTUATING UNIT

(75) Inventors: Michael Vogt, Simmern (DE); Ingolf Buchholz, Butzbach/Griedel (DE); Alexander Schubert, Waldems (DE); Thomas Rössler, Amöneburg (DE); Thorsten Neu, Runkel (DE)

(73) Assignee: Continental Teves AG & Co., oHG (DE)

( * ) Notice: Subject to any disclaimer, the term of this patent is extended or adjusted under 35 U.S.C. 154(b) by 619 days.

(21) Appl. No.: 13/389,063

(22) PCT Filed: Jul. 27, 2010

(86) PCT No.: PCT/EP2010/060871
§ 371 (c)(1),
(2), (4) Date: Mar. 20, 2012

(87) PCT Pub. No.: WO2011/018329
PCT Pub. Date: Feb. 17, 2011

(65) Prior Publication Data
US 2012/0167564 A1 Jul. 5, 2012

(30) Foreign Application Priority Data
Aug. 11, 2009 (DE) .......................... 10 2009 037 098

(51) Int. Cl.
B60T 17/22 (2006.01)
B60T 13/72 (2006.01)
(Continued)

(52) U.S. Cl.
CPC ................. B60T 13/72 (2013.01); B60T 7/042 (2013.01); B60T 8/4077 (2013.01)

(58) Field of Classification Search
USPC ............... 188/1.11 E, 152; 303/114.1, 114.3; 91/367, 369.3; 60/545
See application file for complete search history.

(56) References Cited

U.S. PATENT DOCUMENTS

| | | | |
|---|---|---|---|
| 4,655,511 A | 4/1987 | Leiber | |
| 6,386,087 B2 * | 5/2002 | Takayama et al. | .............. 91/367 |
| 2009/0090585 A1 | 4/2009 | Sikorski | |

FOREIGN PATENT DOCUMENTS

| | | |
|---|---|---|
| DE | 2105788 | 8/1972 |
| DE | 3409705 A1 | 9/1985 |

(Continued)

OTHER PUBLICATIONS

International Application Serial No. PCT/EP2010/060871, International Search Report and Written Opinion mailed Feb. 9, 2011, 10 pgs.

(Continued)

Primary Examiner — Alonzo Chambliss
(74) Attorney, Agent, or Firm — RatnerPrestia

(57) ABSTRACT

A brake actuating unit for actuating a motor vehicle braking system of the "brake-by-wire" type having a brake booster. In order to provide a brake actuating unit for actuating a motor vehicle braking system of the "brake-by-wire" type, which on the one hand fulfills the statutory requirements care and which on the other hand is inexpensive to produce, it is proposed according to aspects of the invention, that the brake booster be provided as a travel-controlled brake booster, so that when not in the "brake-by-wire" operating mode the brake pedal is decoupled from feedback forces of the brake actuating unit, and the return force is simulated by the pedal travel simulator even when not in the "brake-by-wire" operating mode.

9 Claims, 4 Drawing Sheets

(51) Int. Cl.
  *B60T 7/04* (2006.01)
  *B60T 8/40* (2006.01)

(56) References Cited

FOREIGN PATENT DOCUMENTS

| DE | 102005049199 | A1 | 4/2006 |
| DE | 102006036387 | A1 | 2/2007 |
| DE | 102007016754 | A1 | 8/2008 |
| EP | 1738983 | A2 | 1/2007 |

OTHER PUBLICATIONS

German Application Serial No. 102009037098.6, Search Report mailed Jan. 21, 2010, 4 pgs.

\* cited by examiner

BRAKE ACTUATING UNIT FOR ACTUATING A MOTOR VEHICLE BRAKING SYSTEM OF THE "BRAKE-BY-WIRE" TYPE, AND METHOD FOR OPERATING A MOTOR VEHICLE BRAKING SYSTEM BY MEANS OF SUCH A BRAKE ACTUATING UNIT

CROSS REFERENCE TO RELATED APPLICATIONS

This application is the U.S. National Phase Application of PCT International Application No. PCT/EP2010/060871, filed Jul. 27, 2010, which claims priority to German Patent Application No. 10 2009 037 098.6, filed Aug. 11, 2009, the contents of such applications being incorporated by reference herein.

FIELD OF THE INVENTION

The invention relates to a brake actuating unit for actuating a motor vehicle braking system of the "brake-by-wire" type, wherein the brake actuating unit comprises:

a brake booster having a booster housing, the interior of which is divided by at least one moveable wall into a vacuum chamber and a working chamber, and having a control housing which supports the moveable wall and in which a control valve is arranged, which controls a pneumatic pressure differential acting on the moveable wall, wherein the control valve can be actuated by a solenoid both by means of an input element that can be subjected to an input force and brought into a force-transmitting connection with a brake pedal, and also by means of an electronic control unit, wherein a distance, which allows a decoupling of a force-transmitting connection between the brake pedal and the brake booster in the "brake-by-wire" operating mode, is provided between the brake pedal and the brake booster, a brake master cylinder which is connected to the output side of the brake booster and to the piston of which an output force of the brake booster is transmitted, means for detecting the actuation travel of the brake pedal, a pedal travel simulator, which interacts with the brake pedal and which serves, in the "brake-by-wire" operating mode, to simulate a return force acting on the brake pedal irrespective of an actuation of the brake booster, and a method for operating a motor vehicle braking system of the "brake-by-wire" type by means of such a brake actuating unit.

BACKGROUND OF THE INVENTION

A conventional brake actuating unit and a method for monitoring the working of the brake actuating unit are disclosed, for example, by German patent application DE 10 2007 016 754 A1, which is incorporated by reference, and are used in hybrid vehicles, for example. The known brake actuating unit comprises an activation and shutoff device, which activates the pedal travel simulator in the "brake-by-wire" operating mode on decoupling of the force-transmitting connection between the brake pedal and the brake booster, and shuts it off when not in the "brake-by-wire" operating mode. In the known brake actuating unit the shutoff is necessary in order to ensure the statutory minimum deceleration in the event of a fault, that is to say at the fallback level. In this event the pedal travel simulator is disabled and the driver of the motor vehicle can obtain the braking action through the coupling of the force-transmitting connection between the brake pedal and the brake booster with the usual pedal feel.

Since the activation and shutoff device comprises parts, which are not moved in the by-wire mode, a separate check is necessary. The provision of the activation and shutoff device and the necessary method of monitoring are generally regarded as costly.

SUMMARY OF THE INVENTION

An aim of the invention, therefore, is to provide a brake actuating unit for actuating a motor vehicle braking system of the "brake-by-wire" type, which on the one hand fulfills the statutory requirements and which on the other hand is inexpensive to produce.

According to aspects of the invention this is achieved in that the brake booster is provided as a travel-controlled brake booster, so that when not in the "brake-by-wire" operating mode the brake pedal is decoupled from feedback forces of the brake actuating unit, and the return force is simulated by the pedal travel simulator even when not in the "brake-by-wire" operating mode. This therefore eliminates the opposing force, which the driver at the fallback level has to apply in order to bring the vehicle to a standstill. It is thereby possible to dispense with the activation and shutoff device of the known brake actuating unit whilst nevertheless complying with the statutory requirements.

The input force of the brake booster can preferably be transmitted to the piston of the brake master cylinder only indirectly, and the output force of the brake booster is transmitted to the brake master cylinder via a rigid, force-transmitting connection. This serves to ensure that the driver is relieved of any feedback of the brake master cylinder connected to the output side of the brake booster.

According to an advantageous embodiment of the invention, the output force is transmitted from the control housing to the brake master cylinder via a rigid disk, wherein the disk is arranged so as to form a seal in a recess of the control housing. The rigid disk may replace the elastic reaction element of the brake booster of the known brake actuating unit without further modifications of the components, in particular the control housing or a control housing front part.

In order to minimize the modification of the known components, the output force is preferably transmitted from the control housing to the piston of the brake master cylinder via the rigid disk, by way of an output element.

According to an advantageous development of the invention the output element, as a component, can be eliminated in that the output force is transmitted from the control housing directly to the piston of the brake master cylinder via the rigid disk.

The control housing can easily be sealed by providing an annular seal element on the circumference of the disk for sealing purposes.

In a further advantageous embodiment of the invention the output force is transmitted from the control housing to an output element by way of an elastic, disk-shaped seal element, or directly to the piston of the brake master cylinder, wherein a port of the control housing is closed by means of a sleeve element and the port is sealed by means of the elastic, disk-shaped seal element. The known reaction element may be used as the elastic, disk-shaped seal element.

This is further achieved by a method for operating a motor vehicle braking system of the "brake-by-wire" type having a brake actuating unit according to aspects of the invention, which is characterized in that the brake booster is activated purely as a function of the travel, so that when not in the "brake-by-wire" operating mode the brake pedal is decoupled from feedback forces of the brake actuating unit, and the return force is simulated by the pedal travel simulator even when not in the "brake-by-wire" operating mode.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
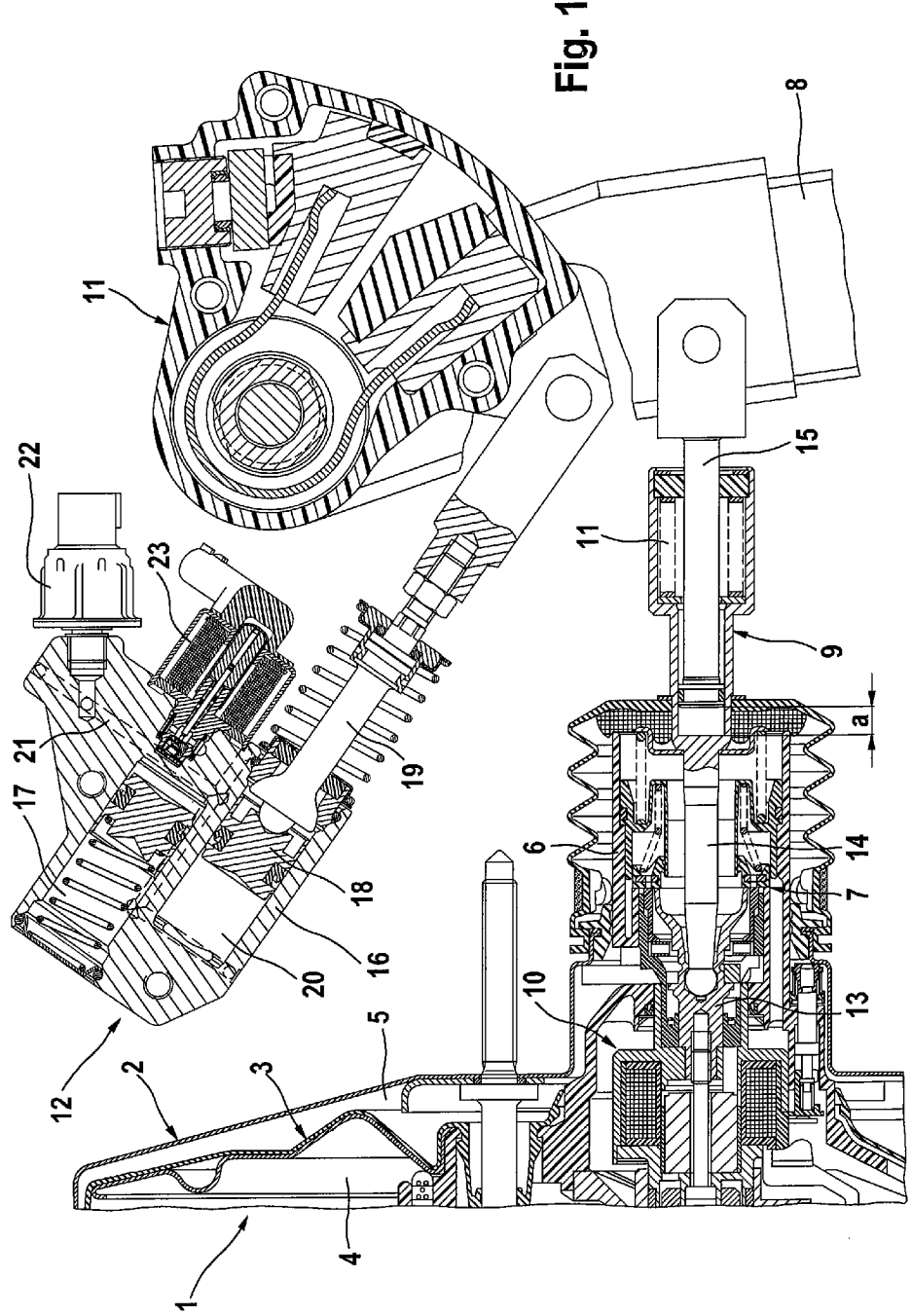
FIG. 1 a partial section through the known brake actuating unit.

FIG. 1 shows a detail of a known brake actuating unit for actuating a motor vehicle braking system of the "brake-by-wire" type. For this reason a brake booster 1, preferably a vacuum brake booster, is merely indicated in a partially sectional representation in FIG. 1. This comprises a booster housing 2, the interior of which is divided by at least one moveable wall 3 into a vacuum chamber 4 and a working chamber 5, and a control housing 6, which supports the moveable wall 3 and in which a control valve 7 is arranged, which controls a pneumatic pressure differential acting on the moveable wall 3. The control valve 7 is can be actuated by a solenoid 10 both by means of an input element 9 that can be brought into a force-transmitting connection with a brake pedal 8, and also by means of an electronic control unit.

Connected to the output side of the brake booster 1 is a brake master cylinder (not shown), to the piston of which an output force of the brake booster 1 is transmitted. The brake master cylinder is preferably provided as a tandem brake master cylinder, to the pressure chambers of which wheel brakes (not shown) are connected by way of a hydraulic control unit.

A pedal travel simulator 11, which interacts with the brake pedal 8, particularly in the "brake-by-wire" operating mode and which imparts the usual brake pedal feel to the driver, interacts with an electro-hydraulic activation and shutoff device 12, which shuts off the pedal travel simulator 11 when not in the "brake-by-wire" operating mode.

A desire for deceleration on the part of the driver, or the actuation travel of the brake pedal 8, is detected by means of at least one sensor device, the signals from which are fed to an electronic control unit. The output signals from the electronic control unit serve, among other things, for activating the solenoid 10, which allows actuation of the pneumatic control valve 7 irrespective of the driver's intentions.

The input element 9, which is coupled to the brake pedal 8 and which is of two-part design comprising a first part 14 connected to the valve piston 6 and a second part 15 connected to the brake pedal 8, serves for transmitting the actuating force introduced into the brake pedal 8 to a valve piston 13 of the control valve 7. An axial distance "a", which in the "brake-by-wire" operating mode ensures a decoupling of the force-transmitting connection between the brake pedal 8 and the brake booster 1, is provided between the two parts 14, 15.

Other embodiments of known brake actuating units provide for the distance "a" between the input element 9 and the brake pedal 3, for example.

The aforementioned activation and shutoff device 12 substantially comprises a piston-cylinder arrangement 16 and a hydraulic fluid receiving chamber 17. A piston 18 of the piston-cylinder arrangement 16 has a force-transmitting connection, by means of an actuating rod 19, to the pedal travel simulator 11, and defines a pressure chamber 20, which by means of a hydraulic connection 21, shown represented by dashed lines, is connected to the fluid receiving chamber 17, which in the example shown is embodied as a low-pressure accumulator. Connected to the hydraulic connection 21 is a pressure sensor 22, which serves for detecting the pressure prevailing in the pressure chamber 17. The connection 21 can be shut off or opened by means of a shutoff valve 23.

In the known brake actuating unit it is necessary to shut off the pedal travel simulator 11, in order to ensure the statutory minimum deceleration of the vehicle in the event of a fault, that is to say at the fallback level. In this event the pedal travel simulator 11 is disabled and the driver of the motor vehicle can achieve the braking effect with the usual pedal feel through the coupling of the force-transmitting connection between the brake pedal 8 and the brake booster 1 that ensues when the distance a between the two parts 14 and 15 is overcome. That is to say the driver actuates the brake booster 1 with the usual force-travel control, since he senses the feedback forces of the pressure built up in the hydraulic circuit as a response force.

As is known, the braking force is transmitted by way of a rubber-elastic reaction element, arranged in the control housing 6 or in its control housing front part, and an output element to a piston of the brake master cylinder of the motor vehicle braking system, which is fitted to the vacuum end of the brake booster 1. The input force introduced on the input element 9 is transmitted to the reaction element by means of the valve piston 13.

The reaction element is of disk-shaped design formed from plastic or rubber material and under pressure loading behaves according to the laws of hydrostatics as an incompressible fluid. That is to say it functions, so to speak, as summing element between the input force introduced by the input element 9 and valve piston 13, the boost forces introduced via the control housing 6 and the braking reaction forces. These braking reaction forces or feedback forces are transmitted back to the driver by transmitting force from the reaction element via the solenoid 10, the valve piston 13 and the input element 9.

Since the activation and shutoff device 12 comprises parts, which are not moved in the "brake-by-wire" operating mode, a separate check is necessary. The provision of the activation and shutoff device 12 and the necessary method of monitoring are generally regarded as costly.

The exemplary embodiments of a brake actuating unit according to aspects of the invention which are described below therefore provide a brake actuating unit for actuating a motor vehicle braking system of the "brake-by-wire" type, which on the one hand fulfills the statutory requirements and on the other is inexpensive to produce.

Figure 2:
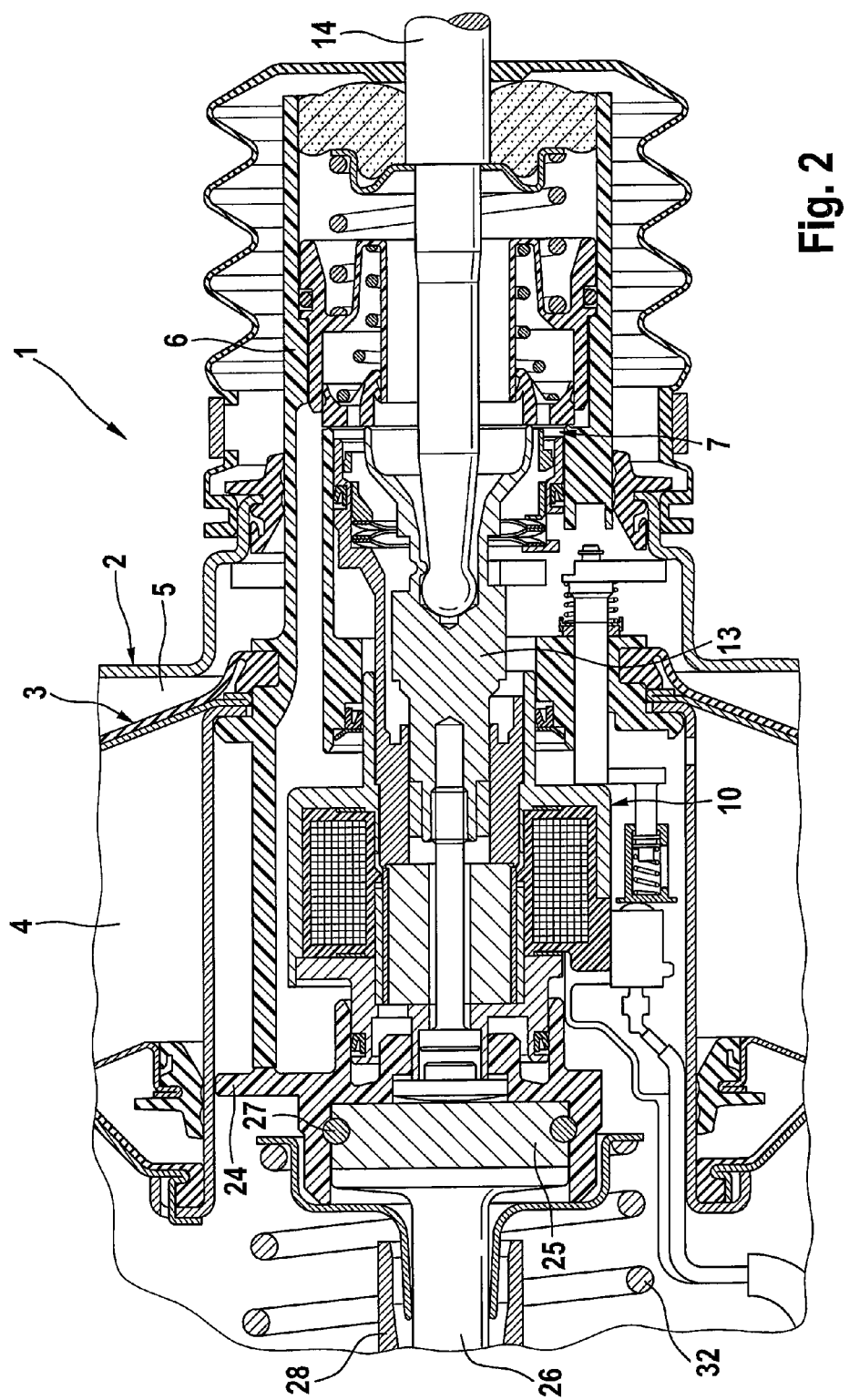
FIG. 2 a detail of a brake booster of a first embodiment of a brake actuating unit according to aspects of the invention.
Figure 3:
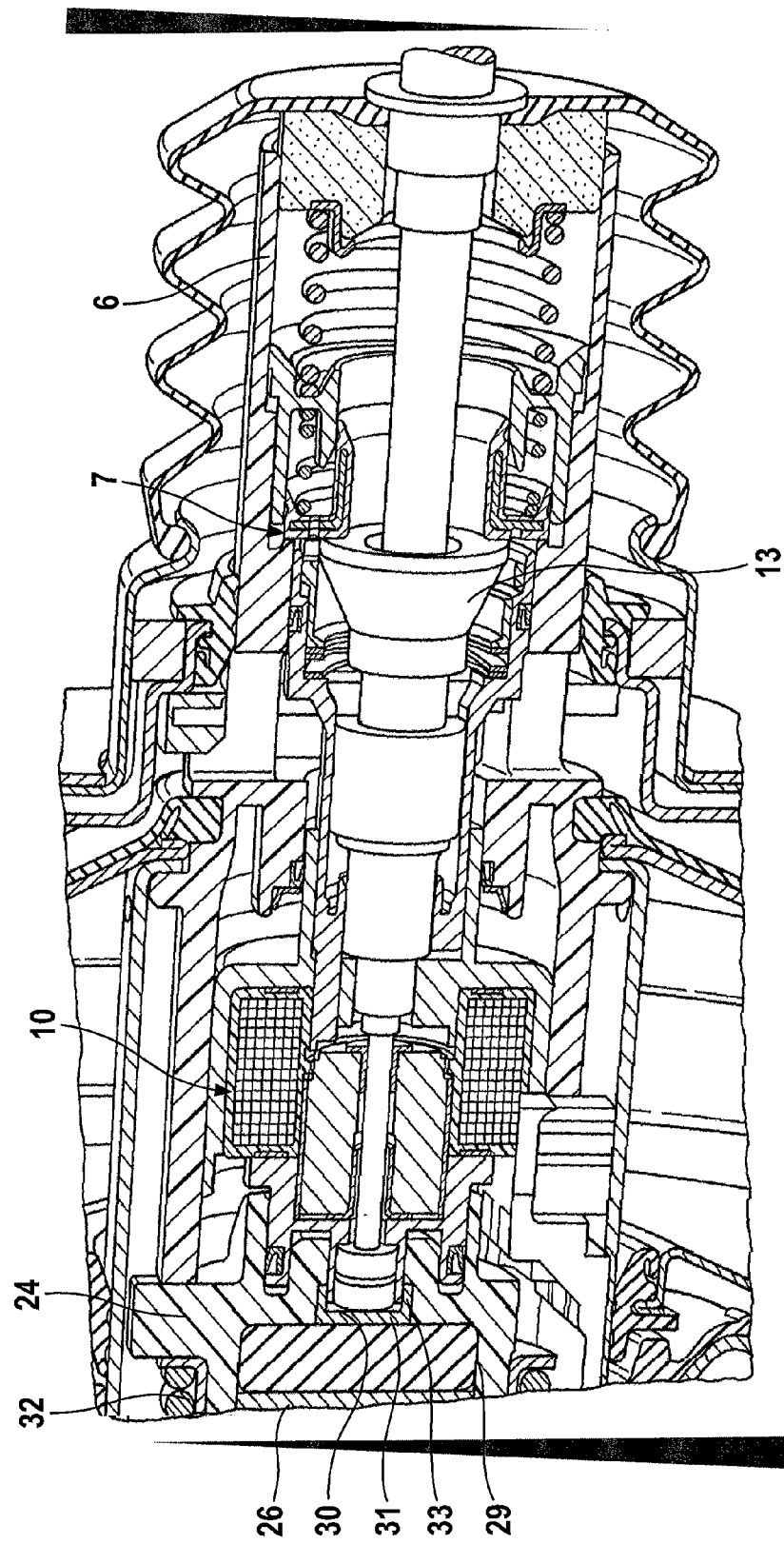
FIG. 3 a detail of a brake booster of a second embodiment of a brake actuating unit according to aspects of the invention and FIG. 4 a travel-pressure diagram of a brake actuating unit according to aspects of the invention.

FIGS. 2 and 3 each show a detail of a brake booster 1 of a brake actuating unit according to aspects of the invention. The two exemplary embodiments differ from the known brake actuating unit described according FIG. 1 largely through the use of a travel-controlled brake booster 1, so that only the features essential for the invention are described below. The same components are provided with the same reference numerals.

The use of a purely travel-controlled brake booster as opposed to the known force-travel-controlled brake booster according to FIG. 1 means that when not in the "brake-by-wire" operating mode the brake pedal 8 is decoupled from feedback forces of the brake actuating unit, and the return force is simulated by the pedal travel simulator 11 even when not in the "brake-by-wire" operating mode. This therefore eliminates the opposing force, which the driver at the fallback level has to apply in order to bring the vehicle to a standstill. It is thereby possible to dispense entirely with the activation and shutoff device 12 of the known brake actuating unit previously described whilst nevertheless complying with the statutory requirements relating to driver foot force in proportion to the vehicle deceleration in the event of a fault.

As can be seen from FIG. 2, instead of the known reaction element in the control housing 6 or in a control housing front part 24, a rigid disk 25, preferably made of steel, is inserted, against which an output element 26 bears. This means that at the fallback level the input force introduced on the brake pedal 8 cannot be transmitted to the output element 26 via the valve piston 13. The output force is applied to the output element 26 by the known working of the control valve 7, which controls a pressure differential between the working chamber 5 and the vacuum chamber 4. It should be noted that the brake booster 1, as is shown in FIG. 2, may also be embodied as a tandem brake booster. Any feedback of the pressure built up in the hydraulic circuit to the driver is prevented, since the rigid disk 25 cannot transmit any forces back to the solenoid 10 and the valve piston 13.

For sealing the control housing front part 24, an annular seal element 27 in the form of an O-ring is provided on the circumference of the disk 25.

The rigid disk 25 may replace the elastic reaction element of the brake booster of the known brake actuating unit without further modifications of the components, in particular the control housing front part 24.

The output force of the brake booster 1 is therefore transmitted to the brake master cylinder via a rigid, force-transmitting connection. Here the output force is transmitted from the control housing front part 24 to a piston 28 (indicated) of the brake master cylinder via the rigid disk 25 by way of the output element 26, in order to minimize the modification of the known components.

According to another advantageous embodiment (not shown), it is feasible to transmit the output force from the control housing front part 24 via the rigid disk 25 directly to the piston 28 of the brake master cylinder, thereby eliminating the output element 26 as a component.

In a second exemplary embodiment of the invention according to FIG. 3, the output force is transmitted from the control housing 6 or its control housing front part 24 to the output element 26 by way of an elastic, disk-shaped seal element 29, or also directly to the piston 28 of the brake master cylinder. Here a port 30 provided in the control housing front part 24 may be closed by means of a sleeve element 31, wherein the port 30 is sealed by means of the elastic, disk-shaped seal element 29. The known reaction element may be used as the elastic, annular seal element 29.

Figure 4:
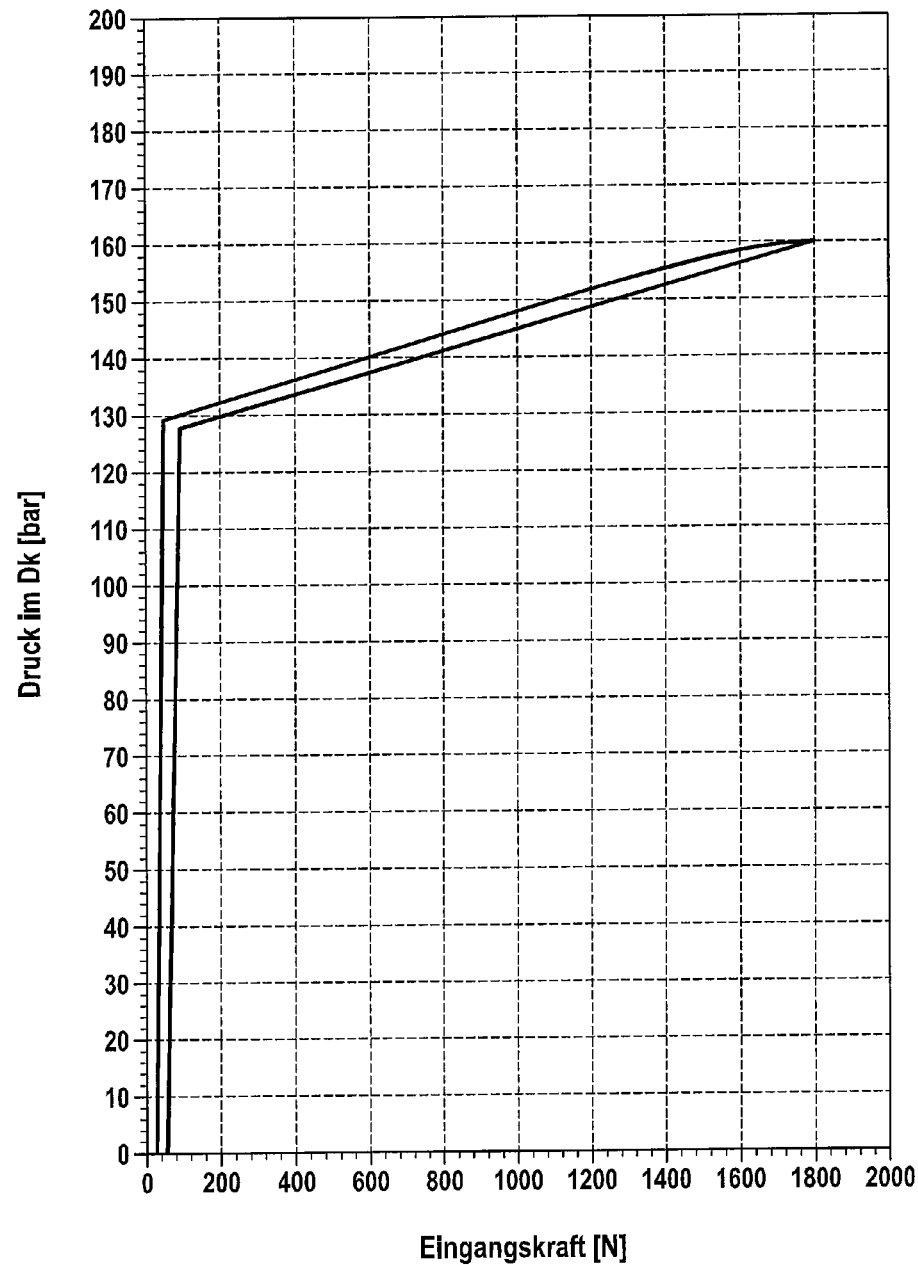

FIG. 4 shows a typical travel-pressure diagram of a brake actuating unit according to aspects of the invention.

In a further exemplary embodiment (not shown), the control housing front part 24 is designed in such a way that it does not have a port 30. The disk 25 and the sealing by means of the seal element 27 or the disk-shaped seal element 29 can thereby be dispensed with entirely. It is also possible to dispense with a thrust piece 33 shown in FIG. 3 since, as described, the input force is transmitted only indirectly. The control housing front part 24 can thereby be substantially simplified.

The advantages listed below are common to the exemplary embodiments:

The activation and shutoff device 12 of the known brake actuating unit is completely eliminated, thereby achieving a cost saving.

The omission of the activation and shutoff device 12 also eliminates any complicated monitoring, thereby also avoiding sources of error, so that the braking system becomes more robust overall.

The brake actuating unit can be designed more robustly. This results in a reduced brake pedal play.

In the event of a fault the brake pedal 8 is returned more reliably and rapidly by the pedal travel simulator 11, particular in cold conditions.

Since the brake booster 1 is travel-controlled, its response force can be reduced.

The space gained in the brake booster 1 means that the solenoid 10 can be enlarged, so that more power is available for opening of the control valve 7, particularly in cold conditions. This therefore increases the working temperature range and the characteristic curve of the brake booster 1 can be optimized, thereby increasing the pressure control comfort.

According to an exemplary embodiment (not shown) the control housing front part 24 can be substantially simplified, so that the rigid disk 25 can be dispensed with entirely. If the port 30 is also omitted during manufacture of the control housing front part 24, the sealing at this point can also be dispensed with. The control housing front part 24 then serves only to support a unit spring 32 and the output element 26. A cost saving and greater robustness can thereby be achieved.

The removal of the reaction element reduces the lost travel resulting from an increase in length due to temperature changes, so that closing travels in the brake master cylinder can be optimized.

Consequently the pressure control comfort in the active mode is improved, since small pressure gradients can be controlled.

Optimization of the brake booster 1 means that the idle travel between the brake pedal 8 and the brake booster 1 can be increased, affording more comfort in driving operation and in recovery.

LIST OF REFERENCE NUMERALS 1 brake booster
2 booster housing
3 moveable wall
4 vacuum chamber
5 working chamber
6 control housing
7 control valve
8 brake pedal
9 input element
10 solenoid
11 pedal travel simulator
12 activation and shutoff device
13 valve piston
14 part
15 part
16 piston-cylinder arrangement
17 fluid receiving chamber
18 piston 19 actuating rod
20 pressure chamber
21 connection
22 pressure sensor
23 shutoff valve
24 control housing front part
25 disk
26 output element
27 seal element
28 piston
29 seal element
30 port
31 sleeve element
32 unit spring
33 thrust piece
a distance

The invention claimed is:

1. A brake actuating unit for actuating a motor vehicle braking system of the "brake-by-wire" type, wherein the brake actuating unit comprises:
   a brake booster having a booster housing, the interior of which is divided by at least one moveable wall into a vacuum chamber and a working chamber, and having a control housing which supports the moveable wall and in which a control valve is arranged, which controls a pneumatic pressure differential acting on the moveable wall, wherein the control valve can be actuated by a solenoid both by an input element that can be subjected to an input force and brought into a force-transmitting connection with a brake pedal, and also by means of an electronic control unit, wherein a distance (a), which allows a decoupling of a force-transmitting connection between the brake pedal and the brake booster in the "brake-by-wire" operating mode, is provided between the brake pedal and the brake booster,
   a brake master cylinder which is connected to the output side of the brake booster and to the piston of which an output force of the brake booster is transmitted,
   means for detecting the actuation travel of the brake pedal, and
   a pedal travel simulator, which interacts with the brake pedal and which serves, in the "brake-by-wire" operating mode, to simulate a return force acting on the brake pedal irrespective of an actuation of the brake booster, wherein the brake booster is provided as a travel-controlled brake booster, so that when not in the "brake-by-wire" operating mode the brake pedal is decoupled from feedback forces of the brake actuating unit, and the return force is simulated by the pedal travel simulator even when not in the "brake-by-wire" operating mode.

2. The brake actuating unit as claimed in claim 1, wherein the input force of the brake booster can be transmitted to the piston of the brake master cylinder only indirectly, and the output force of the brake booster is transmitted to the brake master cylinder via a rigid, force-transmitting connection.

3. The brake actuating unit as claimed in claim 2, wherein the output force is transmitted from the control housing to the brake master cylinder via a rigid disk that forms part of the rigid, force transmitting connection, wherein the disk is arranged so as to form a seal in a recess of the control housing.

4. The brake actuating unit as claimed in claim 3, wherein the output force is transmitted from the control housing to the piston of the brake master cylinder via the rigid disk by way of an output element.

5. The brake actuating unit as claimed in claim 3, wherein the output force is transmitted from the control housing directly to the piston of the brake master cylinder via the rigid disk.

6. A brake actuating unit for actuating a motor vehicle braking system of the "brake-by-wire" type, wherein the brake actuating unit comprises:
   a brake booster having a booster housing, the interior of which is divided by at least one moveable wall into a vacuum chamber and a working chamber, and having a control housing which supports the moveable wall and in which a control valve is arranged, which controls a pneumatic pressure differential acting on the moveable wall, wherein the control valve can be actuated by a solenoid both by an input element that can be subjected to an input force and brought into a force-transmitting connection with a brake pedal, and also by means of an electronic control unit, wherein a distance (a), which allows a decoupling of a force-transmitting connection between the brake pedal and the brake booster in the "brake-by-wire" operating mode, is provided between the brake pedal and the brake booster,
   a brake master cylinder which is connected to the output side of the brake booster and to the piston of which an output force of the brake booster is transmitted,
   means for detecting the actuation travel of the brake pedal, and
   a pedal travel simulator, which interacts with the brake pedal and which serves, in the "brake-by-wire" operating mode, to simulate a return force acting on the brake pedal irrespective of an actuation of the brake booster, wherein the brake booster is provided as a travel-controlled brake booster, so that when not in the "brake-by-wire" operating mode the brake pedal is decoupled from feedback forces of the brake actuating unit, and the return force is simulated by the pedal travel simulator even when not in the "brake-by-wire" operating mode,
   wherein the output force is transmitted from the control housing to the brake master cylinder via a rigid disk, wherein the disk is arranged so as to form a seal in a recess of the control housing, and an annular seal element is provided on the circumference of the disk for sealing purposes.

7. The brake actuating unit as claimed in claim 2, wherein the output force is transmitted from the control housing to an output element of the brake booster by way of an elastic, disk-shaped seal element, or directly to the piston of the brake master cylinder, wherein a port of the control housing is closed by means of a sleeve element and the port is intended to be sealed by means of the elastic, disk-shaped seal element.

8. A method for operating a motor vehicle braking system of the "brake-by-wire" type comprising a brake actuating unit as claimed in claim 1, wherein the brake booster is activated purely as a function of the travel, so that when not in the "brake-by-wire" operating mode the brake pedal is decoupled from feedback forces of the brake actuating unit, and the return force is simulated by the pedal travel simulator even when not in the "brake-by-wire" operating mode.

9. The brake actuating unit as claimed in claim 8, wherein the output force is transmitted from the control housing to the piston of the brake master cylinder via the rigid disk by way of an output element.

* * * * *